United States Patent
Milz

(10) Patent No.: US 7,541,559 B2
(45) Date of Patent: Jun. 2, 2009

(54) CONVEYOR OVEN AND METHOD WITH SMART CONTROL

(75) Inventor: Steve Milz, Pleasantville, NY (US)

(73) Assignee: Lincoln Foodservice Products LLC, Fort Wayne, IN (US)

( * ) Notice: Subject to any disclaimer, the term of this patent is extended or adjusted under 35 U.S.C. 154(b) by 4 days.

(21) Appl. No.: 11/899,780

(22) Filed: Sep. 7, 2007

(65) Prior Publication Data
US 2008/0087173 A1 Apr. 17, 2008

Related U.S. Application Data

(60) Provisional application No. 60/843,221, filed on Sep. 8, 2006.

(51) Int. Cl.
*A21B 1/40* (2006.01)
*A21B 1/48* (2006.01)
*F27B 9/40* (2006.01)
*H05B 1/02* (2006.01)

(52) U.S. Cl. .................... 219/388; 219/413; 219/494

(58) Field of Classification Search ................ None
See application file for complete search history.

(56) References Cited

U.S. PATENT DOCUMENTS

| | | | | |
|---|---|---|---|---|
| 3,721,805 A | * | 3/1973 | Barratt | 219/492 |
| 4,421,015 A | * | 12/1983 | Masters et al. | 99/386 |
| 4,446,358 A | * | 5/1984 | Comerford et al. | 219/388 |
| 4,951,648 A | * | 8/1990 | Shukla et al. | 99/386 |
| 5,112,630 A | * | 5/1992 | Scott | 219/388 |
| 6,369,360 B1 | * | 4/2002 | Cook | 219/388 |
| 6,624,396 B2 | * | 9/2003 | Witt et al. | 219/388 |
| 6,707,014 B1 | * | 3/2004 | Corey et al. | 219/494 |
| 6,817,283 B2 | | 11/2004 | Jones et al. | 99/386 |
| 7,193,184 B1 | * | 3/2007 | Manning | 219/388 |

FOREIGN PATENT DOCUMENTS

WO  WO2005/094647  10/2005

* cited by examiner

*Primary Examiner*—Joseph M Pelham
(74) *Attorney, Agent, or Firm*—Ohlandt, Greeley, Ruggiero & Perle, L.L.P.

(57) ABSTRACT

A cooking device and method that conserves power consumption. The cooking device includes a controller that runs a program that controls the cooking device to changeover from a cook mode to an idle mode when food products are being cooked. The cooking device has a conveyor that conveys food products along a cooking passageway between an inlet and an outlet. A sensing device provides an output indicative of the presence and/or absence of food products on the conveyor. The controller responds to the output to lower the power consumption of the cooking device during the idle mode by operating heating devices and/or fans with lower power.

20 Claims, 2 Drawing Sheets

CONVEYOR OVEN AND METHOD WITH SMART CONTROL

RELATED APPLICATION

This application claims a priority benefit of U.S. Provisional Patent Application Ser. No. 60/843,221, filed on Sep. 8, 2006, the entire contents of which are hereby incorporated by reference.

FIELD OF THE INVENTION

This invention relates to a cooking device and method with reduced heat loss.

BACKGROUND OF THE INVENTION

In cooking devices that have conveyors, heat loss occurs via an inlet and outlet of the device. The heat loss is especially high during idle periods when the cooking device consumes power and none of it is used to cook food.

Thus, there is a need for a cooking device with reduced heat loss or higher power consumption efficiency.

SUMMARY OF THE INVENTION

A cooking device of the present invention comprises a housing having an inlet and an outlet. A conveyor assembly comprising a conveyor is disposed to convey food products that enter the housing via the inlet along a passageway toward the outlet. One or more heating devices are disposed to provide heat to cook the food products while being conveyed along the passageway. A controller controls any one or more of the conveyor assembly and the heating devices to operate in a cook mode and an idle mode based on a presence and an absence of the food products on the conveyor, respectively. The control is in a manner that the power consumption in the cook mode and the idle mode is high and low, respectively.

In another embodiment of the cooking device of the present invention, a sensing device is disposed to provide a sensor output indicative of the presence or the absence of food products on the conveyor. The controller controls the power consumption of any one or more of the conveyor assembly and the heating devices by changing between the cook mode and the idle mode in response to the sensor output.

In another embodiment of the cooking device of the present invention, the sensor output is indicative of a variation of cooking temperature to which the controller responds to change from the cook mode to the idle mode.

In another embodiment of the cooking device of the present invention, the controller changes from the cook mode to the idle mode when a predetermined time has elapsed since the presence of the food products was last detected.

In another embodiment of the cooking device of the present invention, the predetermined time is equal to or greater than a travel time of a food product from a point of detection of the presence on the conveyor to the outlet.

In another embodiment of the cooking device of the present invention, a fan is driven by a fan motor to provide an air stream toward the conveyor in the passageway. The one or more heating devices comprise an air heater that heats the air stream. The controller also controls a power consumption of the fan motor to change between the cook mode and the idle mode.

In another embodiment of the cooking device of the present invention, the one or more heating devices further comprise a radiant heater disposed to provide radiant heat to the conveyor in the passageway.

Preferably, the embodiments of the cooking device use a sensing device that is either a temperature sensor or an optical sensor.

In another embodiment of the cooking device of the present invention, the one or more heating devices comprises a heater that heats convection air and that in the cook mode is operated with a duty cycle that seeks to maintain a predetermined temperature of the convection air. The controller responds to a variation of the duty cycle indicative of the absence of the food products to change from the cook mode to the idle mode.

In another embodiment of the cooking device of the present invention, the controller comprises a processor and a power consumption program that when run by the processor controls the power consumption of any one or more of the conveyor assembly and the heating devices by changing between the cook and idle modes based on the presence and absence of the food products on the conveyor.

A method of the present invention controls a cooking device that comprises a housing having an inlet and an outlet, a conveyor assembly that comprises a conveyor disposed to convey food products that enter the housing via the inlet along a passageway toward the outlet, and one or more heating devices disposed to provide heat to cook the food products while being conveyed along the passageway. The method controls any one or more of the conveyor assembly and the heating devices to operate in a cook mode and an idle mode based on a presence and an absence of the food products on the conveyor, respectively. Power consumption in the cook mode and the idle mode is high and low, respectively.

Another embodiment of the method of the present invention further senses food products on the conveyor and provides a sensor output indicative of a presence or an absence of the food products on the conveyor. The controlling step controls the power consumption of any one or more of the conveyor assembly and the heating devices by changing between the cook mode and the idle mode in response to the sensor output.

In another embodiment of the method of the present invention, the sensor output is indicative of a variation of cooking temperature to which the controlling step responds to change from the cook mode to the idle mode.

In another embodiment of the method of the present invention method, the controlling step changes from the cook mode to the idle mode when a predetermined time has elapsed since the presence of the food products was last detected.

In another embodiment of the method of the present invention method, the predetermined time is equal to or greater than a travel time of a food product from a point of detection of the presence on the conveyor to the outlet.

In another embodiment of the method of the present invention method, the cooking device further comprises a fan driven by a fan motor to provide an air stream toward the conveyor in the passageway. The one or more heating devices comprise an air heater that heats the air stream. The controlling step also controls a power consumption of the fan motor to change between the cook mode and the idle mode.

In another embodiment of the method of the present invention method, the one or more heating devices further comprise a radiant heater disposed to provide radiant heat to the conveyor in the passageway.

Preferably, in the embodiments of the method of the present invention the sensing step uses a temperature sensor or an optical sensor.

In another embodiment of the method of the present invention method, the one or more heating devices comprises an air heater that heats convection air. The controlling step during the cook mode operates the air heater with a duty cycle that seeks to maintain a predetermined temperature of the convection air. The controlling step responds to a variation of the duty cycle indicative of the absence of the food products to change from the cook mode to the idle mode.

In another embodiment of the method of the present invention method, the cooking device further comprises a controller that includes a processor and a power consumption program that when run by the processor performs the controlling step.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
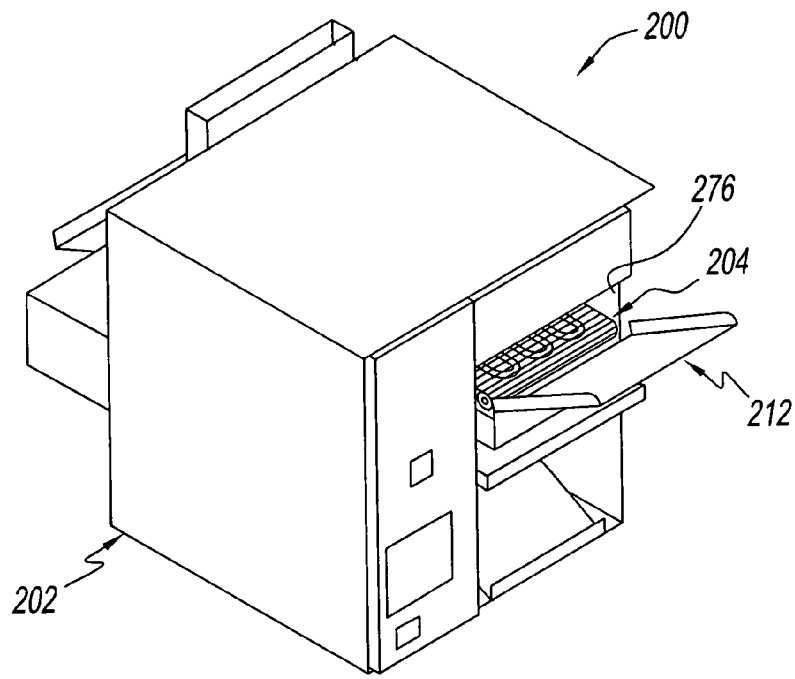
FIG. 1 is a perspective view from the food inlet side of a high speed cooking device according to the present invention.
Figure 2:
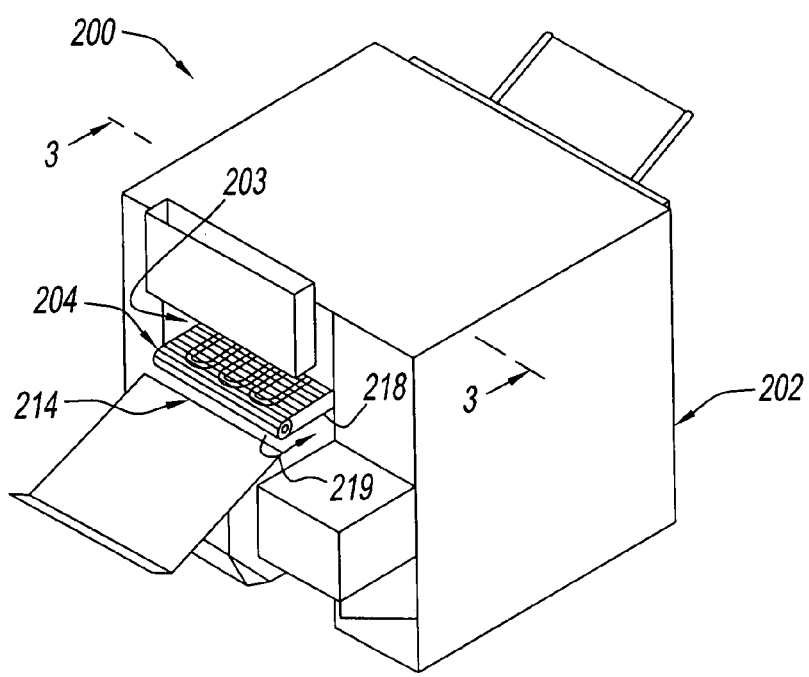
FIG. 2 is a perspective view from the food outlet side of the FIG. 1 cooking device.
Figure 3:
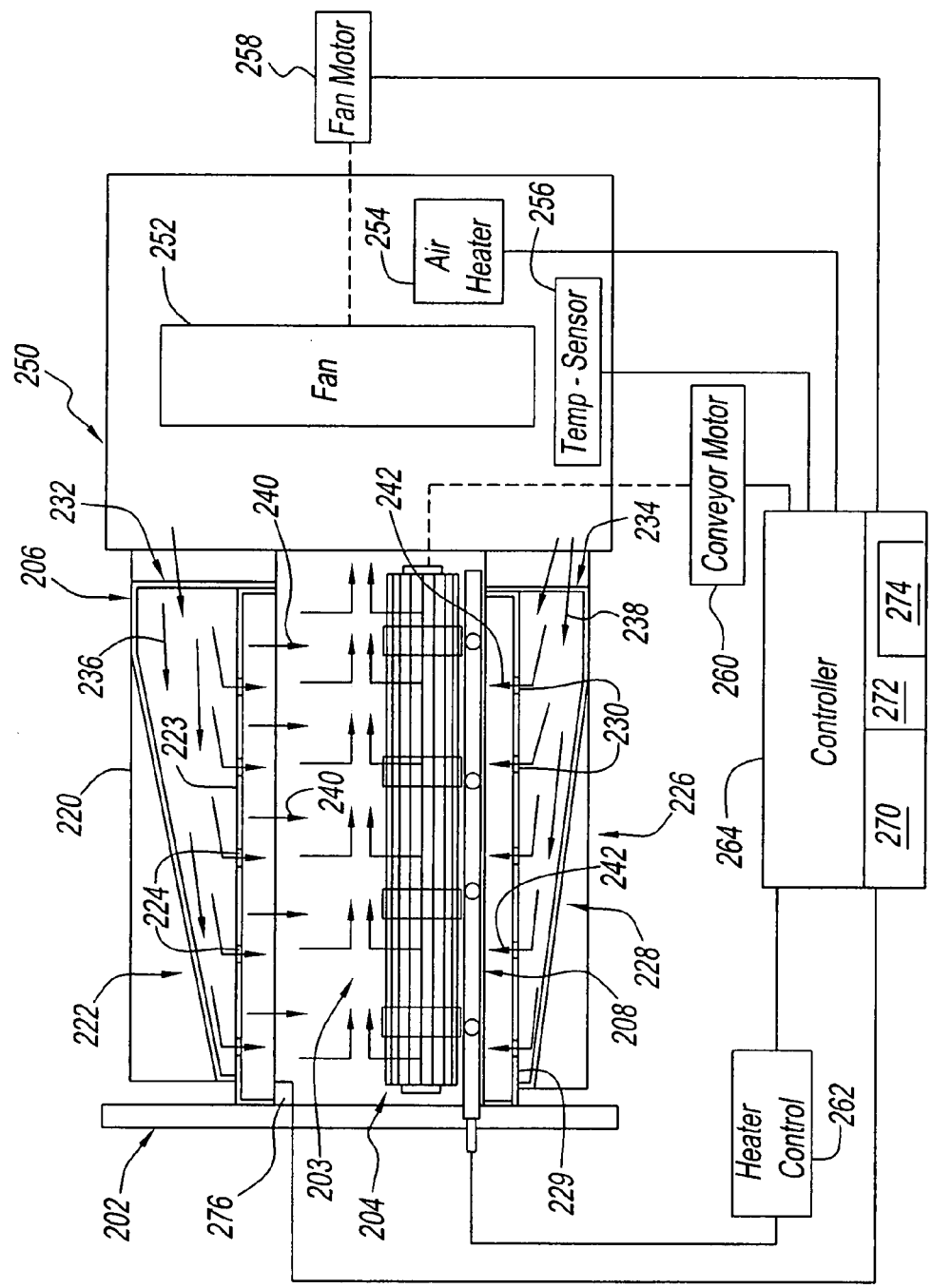
FIG. 3 is a view taken along line 3 of FIG. 2.

With reference to FIGS. 1 through 3, there is provided a high speed cooking device 200 according to a preferred embodiment of the present invention. High speed cooking device 200 includes a housing 202 and a conveyor assembly 204

Housing 202 includes an inlet 212 and an outlet 214. A food product (not shown) enters cooking device 200 via inlet 212 and is conveyed by conveyor assembly 204 to outlet 214 along a toasting/cooking passageway 203. Conveyor assembly 204 includes a conveyor belt 218 arranged in a loop that rotates in the direction illustrated by arrow 219 in FIG. 2 to convey food products along toasting/cooking passageway 203 from inlet 212 toward outlet 214.

Referring to FIG. 3, high speed cooking device 200 also includes an air impingement assembly 206 and a radiant heater 208. Preferably, radiant heater 208 provides radiant energy in the infrared range. Radiant heater can be any suitable electric or gas heater and is shown as an electric heater by way of example. Toasting/cooking passageway 203 is located above conveyor assembly 204. Although conveyor assembly 204 is shown with only a single belt 218, it will be apparent to those skilled in the art that conveyor assembly 204 may have two or more belts disposed to convey food products (not shown) along toasting/cooking path 203. A conveyor motor 260 is disposed to rotate belt 218 of conveyor assembly 204 at a desired speed for cooking the food products.

Air impingement assembly 206 includes an upper air plenum 220 and a lower air plenum 226 that are in fluid communication with a fan box 250. Upper air plenum 220 has a distribution ramp 222, a bottom surface 223 and a plurality of apertures 224 formed in bottom surface 223. Lower air plenum 226 has a distribution ramp 228, a top surface 229 and a plurality of apertures 230 formed in top surface 229.

A fan 252, an air heater 254 and a temperature sensor 256 are disposed in fan box 250. A fan motor 258 is disposed to rotate fan 252. When fan 252 rotates, an airflow is generated in air plenum fan box 250 that is heated by air heater 254. The heated air flows from fan box 250 via a slot 232 into upper air plenum 220 and a slot 234 into lower air plenum 226 as indicated by arrows 236 and 238, respectively. The heated airflow in upper air plenum 218 is deflected by ramp 222 to flow downwardly through apertures 224 as indicated by arrows 240 toward the top of conveyor assembly 204 and into toasting/cooking passageway 203. The heated airflow in lower air plenum 226 is deflected upwardly by ramp 228 through apertures 230 as indicated by arrows 242 toward the bottom of and through conveyor assembly 204 into toasting/cooking passageway 203.

Upper air plenum 220 and lower air plenum 226 may each suitably be a single jet finger that has a length substantially along toasting/cooking passageway 203. Alternatively, upper air plenum 218 and lower air plenum 226 may each be a plurality of jet fingers. Preferably, apertures 224 and 230 have a shape that provides columns of impingement air. Examples of suitable shapes are shown in U.S. Pat. No. 6,817,283.

Electrical heater 208 is disposed above lower plenum 226. Radiant heater 208 may be an infrared heater that is formed in a serpentine pattern to wind about apertures 230, but to avoid overlying apertures 230. This arrangement permits infrared energy emitted by radiant heater 208 and convection energy of air impingement columns flowing upwardly from apertures 230 to have minimal interference with one another. That is, radiant heater 208 does not impede the airflow and the airflow does not reduce the infrared emissions by cooling radiant heater 208.

Cooking device 200 provides a cooking environment that is extremely hot from above and below toasting/cooking passageway 203, while gaining the benefit of added crunchiness afforded by infrared heater 208. If multiple radiant heaters and spaced multiple upper and lower jet fingers are used, multiple distinct cooking zones are defined that can be controlled for heating temperatures and food product resident times within each zone. This affords great flexibility in the toasting/cooking process.

In alternate embodiments, one or more additional heaters can be disposed above conveyor 204 to provide radiant heat from above to the food products.

The present invention detects when high speed cooking device 200 has been idle for a period of time and then changes the device's operating mode from a cook mode to an idle mode. The invention also detects a subsequent placement of a food product on conveyor 204 and returns high speed cooking device from the idle mode to the cook mode.

High speed cooking device includes a controller 264 that controls air heater 254, fan motor 258, conveyor motor 260 and a heater control 262 that turns heater 208 on and off and/or controls the current thereto. Controller 264 includes a processor 270, a memory 272 and a smart control program 274 stored in memory 272.

Smart control program 274 when run by processor 270 causes controller 264 to operate cooking device in a cook mode for cooking food products and in an idle mode with lower power consumption when food products are not being cooked. When cooking device 200 is operating in the cook mode, controller 264 responds to the air temperature sensed by temperature sensor 256 in fan box 250 attaining a predetermined temperature. When the air temperature has not dropped to a predetermined level over a predetermined time period, the controller will change from cook mode to idle mode.

In an alternate embodiment, the absence of food products on conveyor 204 can be detected by monitoring the duty cycle of air heater 254. Thus, when the duty cycle lowers to a predetermined value, controller 264 responds to initiate a change from cook mode to idle mode.

In another alternate embodiment, the absence of food products on conveyor 204 can be detected by comparing the elapsed time from the time of the latest detection of a presence of a food product on conveyor belt 218 with a predetermined time. The predetermined time is equal to or greater than a travel time of a food product from the point along passageway 203 at which the presence of the food product was last detected. When the predetermined time is attained, controller 264 changes from the cook mode to the idle mode.

When the predetermined temperature is detected, smart control program 274 causes processor 270 to change the operating mode from cook to idle. During the idle mode, smart control program 174 causes controller 264 to operate any one or more of air heater 254, fan motor 258, conveyor motor 260 and motor control 262 in a manner that cooking device 200 consumes less power to thereby increase the overall power efficiency. For example, smart control program 274 during idle mode causes air heater 254 to heat the circulating air to an idle temperature, which is lower than the air temperature during the cook mode, fan motor 258 to operate at a speed lower than during cook mode, conveyor motor 260 to operate conveyor 204 at a speed lower than during cook mode or heater control 262 to operate heater 208 at a lower temperature than during the cook mode.

When cooking device 200 is being operated in idle mode, a sensor 276 (FIGS. 1 and 3) detects the presence of a food product on conveyor 204. Sensor 276, for example, may be an optical sensor that is disposed to detect a food product at a desired point in the travel of conveyor belt 218. The desired point, for example, is preferably in the vicinity of inlet 212, but may be at another point along toasting/cooking passageway 203 in alternate embodiments. Sensor 276 provides an output that is indicative of the presence or absence of a food product on conveyor belt 218 at the point of detection.

When in the idle mode, smart control program 274 responds to the output of sensor 276 that is indicative of the presence of a food product to cause controller 264 to change from idle mode to cook mode. Smart control program 274 causes controller 264 to adjust the conveyor speed based on the current oven environment, i.e., a changeover from idle mode to cook mode. The oven fan and temperature would also be adjusted to compensate for the current environment's operating condition. The fan speed can be speeded above normal velocity to assist in the change over from idle mode to cook mode. During the changeover, these adjustments are controlled to expose the food product to the required amount of air heat, IR heat and impingement to achieve the desired toasting and quality. The conveyor speed is gradually adjusted as the oven cavity reaches the cook mode. For example, conveyor 204 gradually speeds up to a cook mode speed.

The present invention having been thus described with particular reference to the preferred forms thereof, it will be obvious that various changes and modifications may be made therein without departing from the spirit and scope of the present invention as defined in the appended claims.

What is claimed is:

1. A cooking device comprising:
a housing having an inlet and an outlet;
a conveyor assembly comprising a conveyor disposed to convey food products that enter said housing via said inlet along a passageway toward said outlet;
one or more heating devices disposed to provide heat to cook said food products while being conveyed along said passageway;
a controller that controls any one or more of said conveyor assembly and said heating devices to operate and consume power in a cook mode and an idle mode based on a presence and an absence of said food products on said conveyor, respectively, and wherein power consumption in said cook mode and said idle mode is high and low, respectively; and
a device that detects a change in a parameter indicative of said presence or said absence of food products on said conveyor, wherein said controller responds to said detected change to change from one of said cook mode and said idle mode to the other, and wherein said parameter is selected from the group consisting of: temperature and duty cycle of a heater.

2. The cooking device of claim 1, wherein said controller responds to said detected change to controls said power consumption of any one or more of said conveyor assembly and said heating devices by changing between said cook mode and said idle mode.

3. The cooking device of claim 2, wherein said detected change is indicative of a variation of cooking temperature to which said controller responds to change from said cook mode to said idle mode.

4. The cooking device of claim 2, wherein said controller changes from said cook mode to said idle mode when a predetermined time has elapsed since said presence of said food products was last detected.

5. The cooking device of claim 4, wherein said predetermined time is equal to or greater than a travel time of a food product from a point of detection of said presence on said conveyor to said outlet.

6. The cooking device of claim 2, further comprising a fan driven by a fan motor to provide an air stream toward said conveyor in said passageway, wherein said one or more heating devices comprise an air heater that heats said air stream, and wherein said controller also controls a power consumption of said fan motor to change between said cook mode and said idle mode.

7. The cooking device of claim 6, wherein said one or more heating devices further comprise a radiant heater disposed to provide radiant heat to said conveyor in said passageway.

8. The cooking device of claim 2, wherein said device is either a temperature sensor or an optical sensor.

9. The cooking device of claim 1, wherein said one or more heating devices comprises a heater that heats convection air and that in said cook mode is operated with a duty cycle that seeks to maintain a predetermined temperature of said convection air, and wherein said detected change comprises a variation of said duty cycle indicative of said absence of said food products to which said controller responds to change from said cook mode to said idle mode.

10. The cooking device of claim 1, wherein said controller comprises a processor and a power consumption program that when run by said processor controls said power consumption of any one or more of said conveyor assembly and said heating devices by changing between said cook and idle modes based on said presence and absence of said food products on said conveyor.

11. A method of controlling a cooking device that comprises a housing having an inlet and an outlet, a conveyor assembly comprising a conveyor disposed to convey food products that enter said housing via said inlet along a passageway toward said outlet, and one or more heating devices disposed to provide heat to cook said food products while being conveyed along said passageway; said method comprising:
controlling any one or more of said conveyor assembly and said heating devices to operate and consume power in a cook mode and an idle mode based on a presence and an absence of said food products on said conveyor, respectively, and wherein power consumption in said cook mode and said idle mode is high and low, respectively, and detecting a change in a parameter indicative of said presence or said absence of food products on said conveyor, wherein said controller responds to said detected change to change from one of said cook mode and said idle mode to the other, and wherein said parameter is selected from the group consisting of: temperature and duty cycle of a heater.

12. The method of claim 11, further comprising sensing food products on said conveyor and providing a sensor output indicative of said changed parameter, and wherein said controlling step controls said power consumption of any one or more of said conveyor assembly and said heating devices by changing between said cook mode and said idle mode in response to said sensor output.

13. The method of claim 12, wherein said sensor output is indicative of a variation of cooking temperature to which said controlling step responds to change from said cook mode to said idle mode.

14. The method of claim 12, wherein said controlling step changes from said cook mode to said idle mode when a predetermined time has elapsed since said presence of said food products was last detected.

15. The method of claim 14, wherein said predetermined time is equal to or greater than a travel time of a food product from a point of detection of said presence on said conveyor to said outlet.

16. The method of claim 12, wherein said cooking device further comprises a fan driven by a fan motor to provide an air stream toward said conveyor in said passageway, wherein said one or more heating devices comprise an air heater that heats said air stream, and wherein said controlling step also controls a power consumption of said fan motor to change between said cook mode and said idle mode.

17. The method of claim 16, wherein said one or more heating devices further comprise a radiant heater disposed to provide radiant heat to said conveyor in said passageway.

18. The method of claim 12, wherein said sensing step uses a temperature sensor or an optical sensor.

19. The method of claim 11, wherein said one or more heating devices comprises an air heater that heats convection air, wherein said controlling step during said cook mode operates said air heater with a duty cycle that seeks to maintain a predetermined temperature of said convection air, and wherein said detected change comprises a variation of said duty cycle indicative of said absence of said food products to which said controlling step responds to change from said cook mode to said idle mode.

20. The cooking device of claim 11, wherein said cooking device further comprises a controller that includes a processor and a power consumption program that when run by said processor performs said controlling step.

* * * * *